United States Patent Office

2,904,399
Patented Sept. 15, 1959

2,904,399

RECOVERY OF COPPER AND AMMONIA FROM WASTE LIQUORS FROM THE MANUFACTURE OF REGENERATED CELLULOSE

Paul Schubert, Wuppertal-Oberbarmen, Germany, assignor to J. P. Bemberg Aktiengesellschaft, Wuppertal-Oberbarmen, Germany No Drawing. Application October 7, 1955
Serial No. 539,290

Claims priority, application Germany October 9, 1954

1 Claim. (Cl. 23—147)

This invention relates to the recovery of copper and ammonia from waste liquors obtained in the manufacture of regenerated cellulose by the cuprammonium process. The invention relates particularly to a process for recovering copper and ammonia by combining waste liquors in a specific manner, and recovering copper and ammonia simultaneously from the mixture.

In the manufacture of a regenerated cellulose film or foil, for example, by the cuprammonium or copper oxide-ammonia process, copper in the form of aqueous cupric sulfate is transformed into basic copper sulfate by precipitation with ammonia. After decantation of the precipitated basic copper sulfate, having the formula

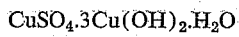

$$CuSO_4 \cdot 3Cu(OH)_2 \cdot H_2O$$

a mother liquor, which is referred to as the "decanting water," results, and it has a neutral reaction and contains a considerable amount of ammonium sulfate and smaller quantities of dissolved or undissolved copper. This "decanting water" is a waste liquor in the process.

The basic copper sulfate is mixed with cellulose, e.g., cotton linters, to produce the "pour solution." This pour solution is then precipitated or coagulated in an aqueous alkaline bath containing about 8% of sodium hydroxide. The product of this precipitation is the "blue film," and the alkaline bath is recirculated, any excess being combined with the "blue water" which is a product of the subsequent decomposition.

The blue film is passed through water in countercurrent to decompose the copper-alkali-cellulose complex film and produce a film consisting principally of cellulose. A waste liquor referred to as "blue water" is also produced, and it contains ammonia, a part of the copper, and the sodium hydroxide carried over from the precipitation bath. The film leaving the decomposition vat is almost free from ammonia, and the blue water or decomposition liquor contains almost the entire quantity of ammonia present in the above-described pour solution.

The dissolved ammonia can be separated and recovered from the blue water by heat and evacuation in known manner. At the same time, copper separates as copper hydroxide or copper oxide. However, for practical purposes, the copper precipitate cannot be reclaimed, because the precipitate is so voluminous and slimy that separation from the water by filtration or settling cannot be accomplished in an economical period of time.

As regards the materials present in the described decanting water, the ammonia present as ammonium sulfate was lost with the waste liquor. Because of its low concentration, the copper could be reclaimed only at considerable expense. It has been attempted to agglomerate the copper in the decanting water after evaporation of the ammonia, by the addition of colloids such as starch, so that the copper could be separated by decantation. However, the small quantity of copper in the decanting water could not be reclaimed in this manner. Also, it was not a simple matter to evaporate the ammonia in the ammonium sulfate.

Where acid wash waters are obtained in rayon manufacture, copper has been recovered from the copper sulfate and free sulfuric acid containing liquors by neutralization and precipitation of the copper sulfate solution with copper hydroxide. This produces the green basic copper sulfate used in the preparation of the pour solution. However, this process is restricted to the recovery of copper from acid wash waters, and it is not possible to recover copper from alkaline waters by this process.

In the copper spinning processes, it has also been proposed to mix the acid and alkaline waters in such proportions that the hydrogen ion concentration of the mixture corresponds to a value near the neutral point, after which the separated copper compounds are segregated. However, the copper separation is incomplete in this method, because ammonium salts are formed which maintain copper in solution in complex form. This copper then must be worked up by exchange-adsorption in a wofatit plant. This method also takes into consideration only the liquors obtained from the spinning operation, and the decanting water obtained in the preparation of the pour solution is not reclaimed.

It is therefore an object of the invention to provide a new and improved method for recovering copper and ammonia from waste liquors obtained in the production of regenerated cellulose by the cupramonnium process.

An important object is to provide a method for recovering copper and ammonia in high recoveries, employing a very simple and economical yet effective method.

A further object is to recover copper and ammonia by employing only the waste products of the manufacturing process, without need for other reagents or considerable equipment.

An additional object is to provide a method whereby copper and ammonia are recovered or separated at the same time, in one operation, in high recoveries which include the recovery of materials hitherto lost as waste.

A further object is to provide a method wherein ammonia is removed simply by heat and evacuation, while the copper precipitates in an easily filterable or separable form. These and other objects and advantages of the invention will be apparent on reference to the specification.

In accordance with the invention, it has now been found that copper and ammonia are very economically and advantageously recovered or reclaimed from waste liquors obtained in the manufacture of regenerated cellulose by the cuprammonium process. In the new method according to the invention, the blue water waste liquor is admixed with the decanting water waste liquor. An amount of the decanting water merely sufficient to reduce the sodium hydroxide alkalinity of the blue water is admixed. After mixing the waste liquors in this manner, the pH of the mixture is about 11-12 due to the ammonia present. The proportion of decanting water combined is regulated or adjusted so that the solution pH does not drop below about 11. The relation of decanting water to blue water is usually 1:2.

From this mixture of waste liquors free of sodium hydroxide alkalinity, the ammonia and copper are then readily separated. On the application of heat and vacuum in the usual manner for reclaiming ammonia from the blue water, as referred to above, ammonia is removed from the mixture. At substantially the same time, the copper precipitates in a dense form which settles and filters well, and it can be separated in this manner. The copper in the precipitate can be reclaimed in known manner by dissolving in acid.

By the new method, not only is the copper which is contained in the blue water recovered, but also, copper which is contained in the decanting water is recovered very economically. Furthermore, in addition to the ammonia which is present in the blue water, ammonia is recovered from the ammonium sulfate of the decanting water in an amount corresponding to the free sodium hydroxide alkalinity neutralized by decanting water.

The following is an example of operation according to the new method of the invention, and it is to be understood that the example is illustrative only and the invention is not limited thereto. The process is e.g. also applicable for waste solutions in the production of other products (as e.g. filaments) produced by the copper ammonia process. In such cases the decanting water has the same composition because there are no differences in the composition of the spinning solutions for films or filaments resp. so that the blue water of the rayon process has nearly the same composition as the blue water in the film production.

*Example*

375 cubic meters of blue water are obtained according to the process described above, and the blue water contains 320 kg. of copper, 1500 kg. of ammonia and 2625 kg. of sodium hydroxide. To the blue water, 110 cubic meters of decanting water obtained in the process as above described, is added. The quantity of decanting water contains 70 kg. of copper and 1100 kg. of ammonia present in ammonium sulfate.

A mixture results which has a volume of 485 cubic meters and has a pH of 11–12. The mixture contains 390 kg. of copper and 2600 kg. of ammonia. By the application of heat, 75° C., and vacuum, 230 mm. Hg, ammonia is removed, and the copper precipitates and is separated by filtration. Copper and ammonia are each recovered from the mixture in a recovery in excess of 95%.

The invention thus provides a very economical and advantageous process for recovering copper and ammonia from the waste liquors. Copper is readily recovered in high yield both from the blue water and from the decanting water. Not only is the ammonia present in the blue water recovered, but ammonia present in the form of ammonium sulfate is recovered from the decanting water. Copper and ammonia which would otherwise be lost in the waste products are recovered. The process is very simply and effectively carried out employing only the waste products of the overall process.

The invention is hereby claimed as follows:

The process for recovering copper values and ammonia from waste liquors obtained in the manufacture of regenerated cellulose by the cuprammonium process wherein decanting water waste liquor containing ammonium sulfate and copper values is obtained in the production of basic copper sulfate and blue water waste liquor containing ammonia, copper values and sodium hydroxide is obtained in the decoppering of a precipitated copper-alkali-cellulose complex, which comprises admixing said last-named waste liquor with an amount of said first-named waste liquor merely sufficient to reduce the sodium hydroxide alkalinity of the former and produce a pH of about 11 to 12 in the resulting mixture, and removing ammonia vapor from the resulting mixture by heat and evacuation, thereby also precipitating copper values from said mixture.

References Cited in the file of this patent

UNITED STATES PATENTS

| | | |
|---|---|---|
| 1,867,357 | Furness | July 12, 1932 |
| 1,920,208 | Mutti | Aug. 1, 1933 |
| 2,141,763 | Richter et al. | Dec. 27, 1938 |
| 2,395,015 | Schlasser et al. | Feb. 19, 1946 |
| 2,532,308 | Hofman | Dec. 5, 1950 |